United States Patent [19]

Newland

[11] Patent Number: 5,606,597
[45] Date of Patent: Feb. 25, 1997

[54] USER PROGRAMMABLE CONFIGURATION OF A TELEPHONE

[75] Inventor: Paul B. Newland, Middletown, N.J.

[73] Assignee: Lucent Technologies Inc., Murray Hill, N.J.

[21] Appl. No.: 233,156

[22] Filed: Apr. 25, 1994

[51] Int. Cl.⁶ ..................................................... H04Q 7/32
[52] U.S. Cl. ............................................. 379/61; 379/355
[58] Field of Search ................................ 379/358, 60, 61, 379/62, 63, 200, 355, 212; 384/734

[56] References Cited

U.S. PATENT DOCUMENTS

| | | |
|---|---|---|
| 5,008,927 | 4/1991 | Weiss et al. . |
| 5,044,010 | 8/1991 | Frenkiel et al. . |
| 5,134,648 | 7/1992 | Hochfield . |
| 5,195,130 | 3/1993 | Weiss et al. . |

FOREIGN PATENT DOCUMENTS

9112682  8/1991  WIPO .

*Primary Examiner*—William Cumming
*Assistant Examiner*—Lisa M. Coward

[57] ABSTRACT

A configuration parameter programming system of a telephone is presented which is executable by an end user or service person. The configuration parameter programming system is accessed through the use of a dial memory register or other data transfer means, and a control means. In this way, the Dial Pulse Rate, Dial Pulse Make/Break Ratio, DTMF Duration, DTMF Inter Digit Delay, Pause Duration and other configuration parameters of a telephone are programmable after manufacture without requiring hardware modification.

16 Claims, 8 Drawing Sheets

USER PROGRAMMABLE CONFIGURATION OF A TELEPHONE

BACKGROUND OF INVENTION

This invention relates to the dual use of a memory storage function and a processing function as a means of programming the configuration of a telephone. The Dial Pulse Rate, Dial Pulse Make/Break Ratio, DTMF Duration, DTMF Inter Digit Delay, Pause Duration and other telephone configuration parameters are typically set during the design phase and are not programmable after manufacture. The configuration parameters set signal timing for country specific applications, audio volume levels for ringing and control tones, telephone keypad illumination timing, and automatic channel select control for applications involving the operation of cordless phones in close proximity to sources of interference. In particular, this invention provides a means to program all of the aforementioned telephone configuration parameters and more which were not mentioned using the telephone keypad or other input means.

THE PRIOR ART

It is well known in the art that microprocessors can be used in telecommunications as shown by Subhash Bal, "New Generation Microprocessor for Telecommunication Applications." Proceedings 1980 International Conference on Communications, Seattle, Wash., (Jun. 8–12, 1980) pages 11.5.1–11.5.4. It is also well known that dial memory registers are used to store commonly used telephone numbers. The dial memory registers are activated through separate buttons or switches and the telephone number (address) is entered into memory through the telephone keypad. However, the prior art does not teach the use of the aforementioned microprocessor and dial memory register(s) as a means to program the configuration parameters of a telephone.

The following is a list of the configuration parameters of a telephone and the definition of each:

1) Dial Mode: the dialing mode, either dual tone multi-frequency dialing (DTMF) or pulse dialing, of a telephone which facilitates communication with the main office.
2) Dial Pulse Rate: the frequency of loop current interruptions, measured in pulses per second (pps), made during the pulse dialing process.
3) Dial Pulse Make/Break Ratio: the ratio of the time that loop current flows to the time that loop current does not flow during the pulse dialing process.
4) Pulse Inter-Digit Delay: the amount of time, in milliseconds, required between bursts of pulses during the pulse dialing process.
5) DTMF Duration: the amount of time, measured in milliseconds (ms), required for the main office to correctly interpret a DTMF tone generated by a caller's telephone during the DTMF dialing process.
6) DTMF Inter-Digit Delay: the amount of time, measured in milliseconds (ms), required between DTMF tones during the DTMF dialing process.
7) Pause Duration: in an application where a first key digit must be depressed to gain access to an outside telephone line, the amount of time, in milliseconds, required between the first key digit and the rest of a telephone number.
8) Flash Duration: an amount of time where there is a simulated depression of a hook switch, in milliseconds, which induces call waiting or conference call operation.
9) Ringer mode: a mode indicating that a telephone ringer is inhibited or permitted.
10) Ringer Tone: the audible frequencies emitted from a telephone of a called party indicating an incoming call.
11) Ringer Volume: the audible intensity level of a telephone ringing mechanism.
12) Ring Pattern Ignore: in an application, for example, where in-house phone calls have one ring pattern and outside calls have another ring pattern; the ability to inhibit a telephone ringer based on an incident ring pattern.
13) Key Beep Tone: the tone of an audible feedback signal emitted from a caller's receiver when a key is depressed.
14) Key Beep Volume: the audible intensity level of a feedback signal which emanates from a caller's receiver when a key is depressed.
15) Key Beep Duration: the amount of time that a feedback signal is emitted from a caller's receiver when a key is depressed.
16) Receiver Volume: the intensity level of any audible signal which is emitted from a telephone receiver.
17) Key Pad Illumination Duration: the amount of time, measured in seconds, that a keypad of a telephone remains illuminated after it is activated.
18) Automatic Channel Select Mode Enable/Disable: a signal which enables or disables an automatic carrier frequency selection process for the transmit/receive channel of a cordless telephone.
19) Automatic Channel Select Permit/Inhibit: a plurality of signals which selectively permit or inhibit the availability of a specific transmit/receive channel of a cordless telephone.

The aforementioned configuration parameters of a telephone can be categorized into the three groups shown below in Table 1. Additionally, as an illustration, the configuration parameter values of a cordless telephone used on average by a person in North America are shown. It is noted that user specific and cordless specific configuration parameters are more likely to be programmed by an end user than a manufacturer. The manufacturer is likely to program the location specific configuration parameters.

TABLE 1

Illustrative example of the configuration parameter values of a cordless telephone used in North America.

| Category | Configuration Parameter | Value |
| --- | --- | --- |
| location Specific | Dial Mode | DTMF |
| | Dial Pulse Rate | 10 pps |
| | Dial Pulse Make/Break Ratio | 40/60 |
| | Pulse Inter-Digit Delay | 700 ms |
| | DTMF Duration | 50 ms |
| | DTMF Inter-Digit Delay | 50 ms |
| | Pause Duration | 400 ms |
| | Flash Duration | 400 ms |
| user specific | Ringer Mode | permitted |
| | Ringer Tone | standard |
| | Ringer Volume | med. high |
| | Ring Pattern Ignore | inhibit |
| | Key Beep Tone | tone 1 |

TABLE 1-continued

Illustrative example of the configuration
parameter values of a cordless telephone used in
North America.

| Category | Configuration Parameter | Value |
| --- | --- | --- |
| | Key Beep Volume | low |
| | Key Beep Duration | long |
| | Receiver Volume | med. high |
| | Key Pad Illumination Duration | 10 sec |
| cordless | Automatic Channel Select Mode | Enabled |
| specific | Automatic Channel Select | Ch1 permitted |

The operation of a cordless phone, specifically regarding an automatic channel select feature, is presented and discussed in detail in the prior art U.S. Pat. No. 5,044,010. Cordless telephones are discussed herein because their higher complexity over corded phones gives rise to a presentation of additional configuration parameters. This invention is suited to being used with both cordless and corded telephones.

SUMMARY OF THE INVENTION

The present invention is directed towards a system which provides a means for programming the configuration parameters of a telephone. The invention generally consists of a control means, memory means and modified telephone hardware of the prior art. Most of the telephone hardware of the prior art, whether for a corded telephone, cordless telephone or a cellular telephone, will allow implementation of the present invention; however some circuits of the prior art may require slight modifications to accept signals which alter their transfer functions in accordance with this invention. The memory means is used for the dual purpose of providing a user accessible storage medium for storing telephone configuration parameter data and dialing digits of a commonly called telephone number. In alternate embodiments the memory means may be solely used to store telephone configuration parameter data. The control means has resident software which facilitates interpretation of the data of the dual memory means, transitions between normal operating modes and the configuration parameter programming mode, and the alteration of the transfer functions of some telephone circuitry in accordance with generated control signals.

DESCRIPTION OF THE DRAWING

The invention can be better understood when considered with the following drawings wherein.

DETAILED DESCRIPTION OF THE PREFERRED EMBODIMENT

This invention is directed to providing a telephone with a means to enable a service person or an end user to program the configuration parameters of a telephone for its use in a particular application. This invention makes dual use of a dial memory register, found in most telephones. This dual dial memory register is used to store commonly called telephone numbers and configuration parameter data of the telephone. In alternate embodiments a memory means which is only used to store the configuration parameters of a telephone may be employed.

This embodiment discusses using the invention in a cordless telephone. The advantages over the prior art that this invention provides are not limited to cordless telephone applications. Although corded telephones are also suited to using this invention, the higher complexity of a cordless telephone introduces more configuration parameters than that of a corded model and, therefore, facilitates a broader discussion of the invention.

Figure 1:
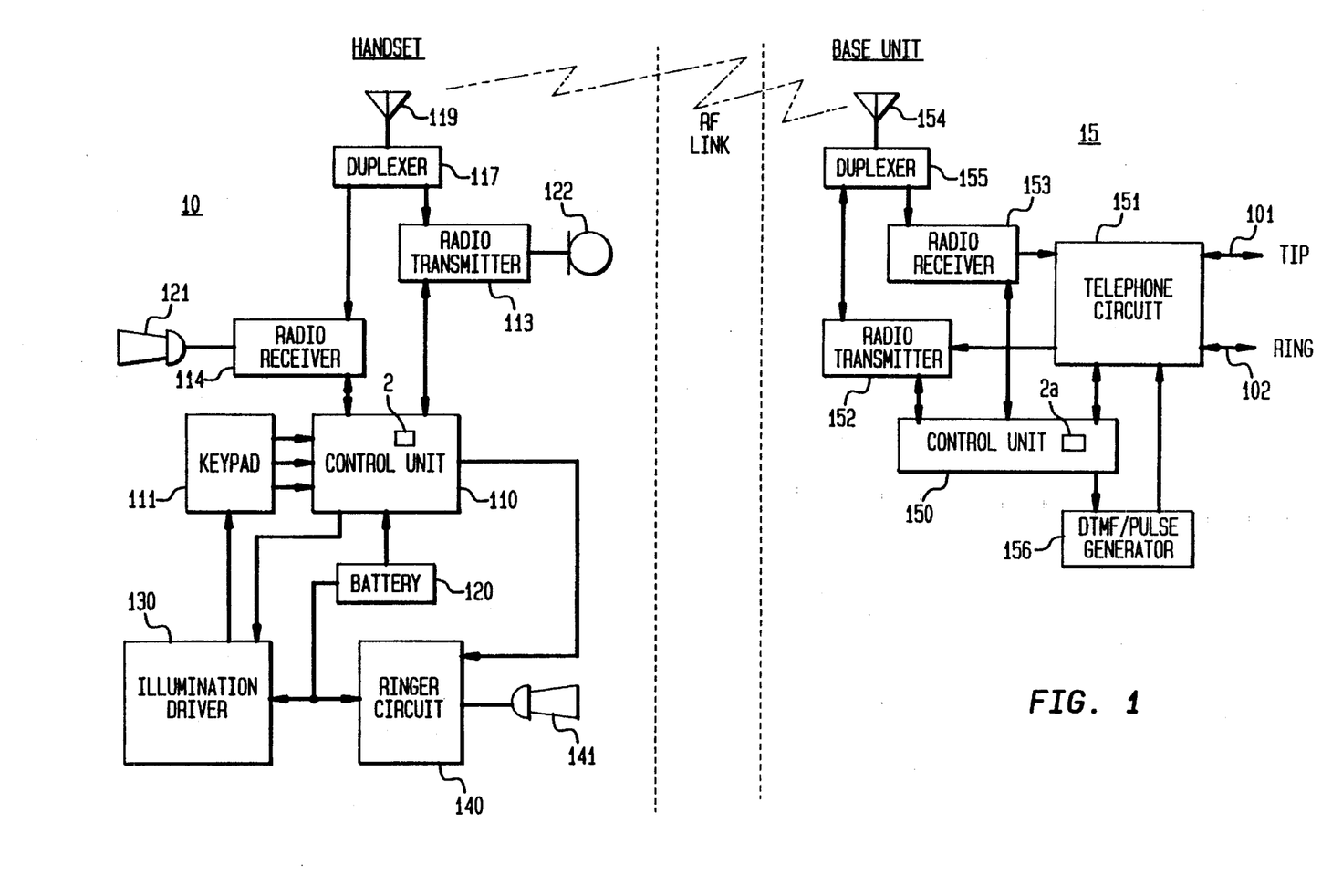
FIG. 1 is a block diagram of a cordless telephone which is suited to incorporate the configuration parameter programmability of the present invention.

FIG. 1 shows a block diagram of a cordless telephone employing the configuration programming means of the present invention. As shown, the cordless telephone generally comprises a handset unit 10 and a base unit 15 which are both operable on a plurality of communication channels. Included in the handset unit 10 is a control unit 110 which provides a number of control functions. This control unit 110 may be implemented through the use of a microcomputer containing read-only-memory (ROM), random-access-memory (RAM) and through the use of proper coding. Such a microcomputer is known in the art and is readily available from semiconductor manufacturers such as Philips, Intel and AMD.

The control unit 110 configures a radio frequency (RF) transmitter 113 and an RF receiver 114 for operation on each of a plurality of channels, thus allowing the automatic channel select configuration parameters to be programmed. Prior art U.S. Pat. No. 5,044,010 presents the automatic channel select feature of a cordless telephone in detail. The transmitter 113 and the receiver 114 respectively transmit signals to and receive signals from the base unit 15 with the control unit 110 providing the appropriate channel control information to both units.

The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 demodulates voice signals transmitted by the base unit 15 and couples these signals to a loudspeaker 121. The control unit 110 also configures the output stage of the receiver 114 such that the receiver audible volume level is acceptable to the user. Key Beep Tone, Key Beep Volume and Key Beep Duration are also adjusted in accordance with commands of the control unit 110 to the receiver 114. A receiver (not shown) such as the Motorola MC3361B is used with additional circuitry as described in the Motorola data book, LINEAR AND INTERFACE INTEGRATED CIRCUITS, 8-56, 57, (Rev. 3 1990) to provide the needed function of the present invention. The transmitter 113 has speech signals as inputs from a microphone 122 which it transmits to the base unit 15.

A battery 120, a keypad 111, an illumination driver 130 and a ringer circuit 140 are also part of the handset unit 10. The battery 120 provides operating power for all circuitry in the handset unit 10. The key pad 111 is used for entering dial digits and control functions executable by the control unit 110 or transmitted to the base unit 15. The illumination driver 130 provides illumination power to the keypad. The illumination power is controlled via the control unit 110 to be present or not present depending on the needs of a particular user.

The ringer circuit 140 and the loudspeaker 141 provide an audible tone which indicates an incoming call. The ringer circuit is comprised of a transistor amplifier responsive to control signals from the control units 110 and 150. The amplifier gain and output frequency content are alterable according to one or more input signals. Thus, Ringer Mode, Ringer Tone and Ringer Volume are configuration parameters which are controlled through the interaction between the ringer circuit 140 and the control unit 110.

Referring next to the base unit 15, there is shown a control unit 150 which interfaces with the control unit 110 in the handset 10. This control unit 150 compares a received security code from the handset unit 10 with a stored security code during the establishment of a two-way communications link between the handset unit 10 and the base unit 15. A favorable comparison of the two security codes must be achieved in order for the base unit 15 to respond to a request-for-service signal from a handset unit 10. This control unit 150 also receives and processes opcode data provided by the handset unit 10 in dialing and providing signaling information out to a central office via a telephone circuit 151 and tip-ring lines 101 and 102. Like the control unit 110, this control unit 150 may be implemented through the use of a microcomputer containing ROM, RAM and through the use of proper coding. A suitable microcomputer is known in the art and is readily available from semiconductor manufacturers such as Philips, Intel and AMD.

Communications with the handset unit 10 are provided via transmitter 152 and receiver 153 in the base unit 15. The output of the transmitter 152 and input for the receiver 153 are commonly coupled to an antenna 154 through a duplexer 155. The telephone circuit 151 serves as a "plain old telephone service" (POTS) interface for signals on the tip-ring lines and for those signals received by the receiver 153 or transmitted by the transmitter 152. Command signals to the telephone circuit 151 from the control unit 150 program the Flash Duration of the system. An integrated circuit (not shown) such as the Motorola MC34013A is used in the telephone circuit 151 with the additional circuitry as described in the Motorola data book, TELECOMMUNICATIONS DEVICE DATA BOOK, 2-278, 292, (Rev. 2 1989) to achieve the needed function of the present invention.

An integrated circuit (not shown) such as the Motorola MC34012-1 is used with the additional circuitry as described in the Motorola data book, TELECOMMUNICATIONS DEVICE DATA BOOK, 2-270, 277, (Rev. 2 1989) to achieve the ring pattern ignore function of the present invention. The MC34012-1 is part of the telephone circuit 151 and detects a ringing pattern on the tip 101 and ring 102 lines. The control unit 150 monitors the output of the integrated circuit to ensure the ringing pattern is a permitted one. If the ringing pattern is permitted, ring signals are sent to the ringer circuit 140 via the control unit 110.

Responsive to the control unit 150, a generator 156 which is configured to either generate DTMF signals or pulse signals (Dial Mode) provides signaling to the telephone circuit 151 for dialing over the tip-ring lines 101 and 102 which connect to the central office or other appropriate switch. Dial Pulse Rate, Dial Pulse Make/Break Ratio, Pulse Inter-Digit Delay, DTMF Duration and DTMF Inter-Digit Delay are also configured via the command link between the control unit 150 and the generator 156. A generator (not shown) such as the Motorola MC145412 is used with the additional circuitry as described in the Motorola data book, TELECOMMUNICATIONS DEVICE DATA BOOK, 2-443, 449, (Rev. 2 1989) to achieve the needed function of the present invention.

The control unit 110 of the handset unit 10 and the control unit 150 of the base unit 15 contain the circuitry known in the art to provide a dial memory register function. At least one dual dial memory register 2 (FIG. 2) of the present invention, or a first portion thereof, is contained within the control unit 110 of the handset unit 10. Alternate embodiments may have at least one dual dial memory register 2a, or a second portion thereof, contained within the control unit 150 of the base unit 15.

Figure 2:
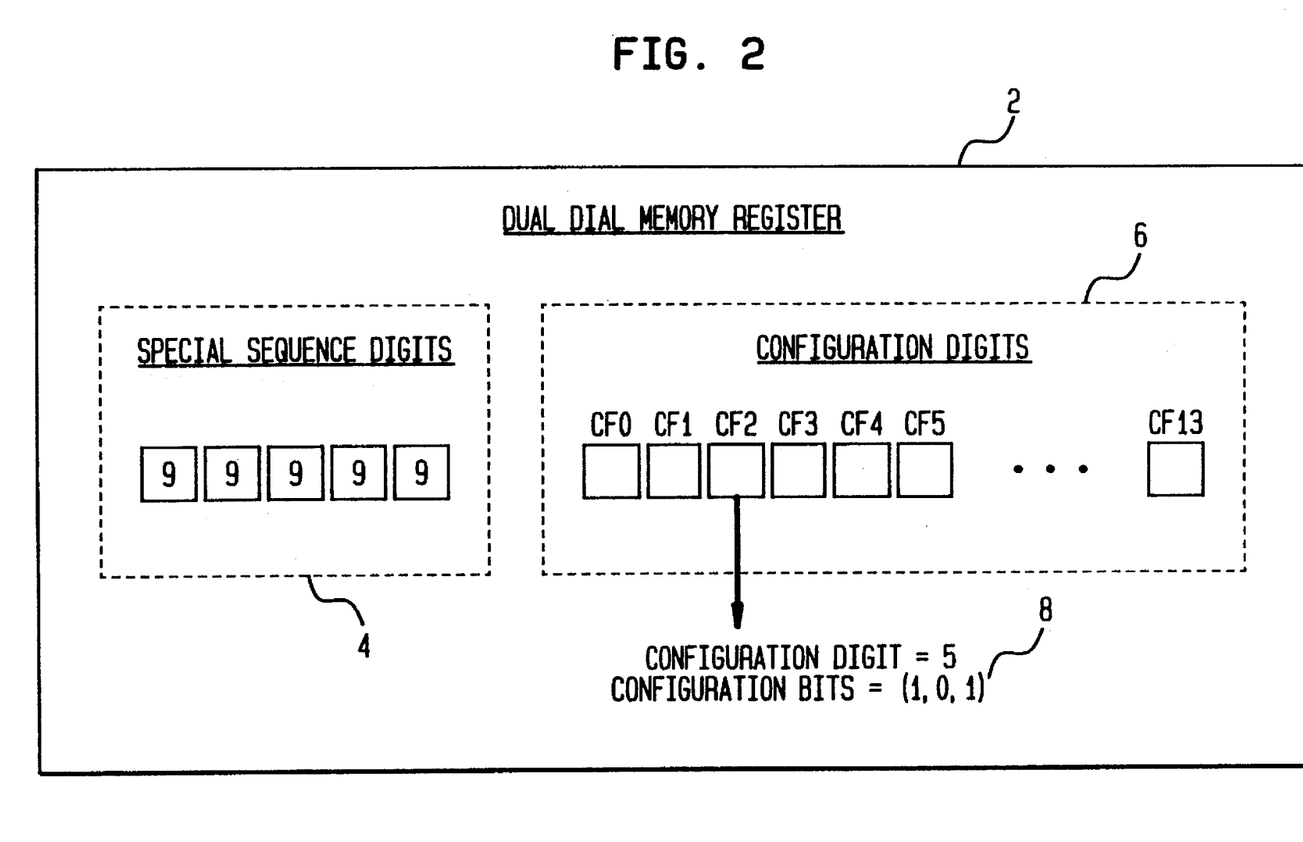
FIG. 2 is a high level diagram of a dual dial memory register of the present invention.

The control unit 110 and/or 150 is used in conjunction with a software program to provide for the interpretation of data stored in the dual dial memory register 2 and/or 2a. The data stored in the dual dial memory register 2 and/or 2a are user-defined digits, a first subset of which causes the control unit 110 and/or 150 to place a call or alter the configuration of the telephone while in a configuration parameter programming mode. When the configuration parameter programming mode is entered, the configuration parameters of the telephone are programmed according to a second subset of the user-defined digits.

FIG. 2 shows a dual dial memory register 2 which comprises five special sequence digits 4 and fourteen configuration digits 6, labeled CF0–CF13. Having nineteen user-defined digits in the dial register is not a requirement for the operation of the invention, however this number of digits suits this particular embodiment. Also, it is noted that several dial memory registers may be designed into the telephone; however, it may only be necessary to designate one memory register as having the dual purpose described above.

A first subset of the user-defined digits, comprising five special sequence digits 4 of the dual dial memory register 2, is used by the control units 110 and 150 respectively as an indicator of how the second subset of user-defined digits is to be used. The second subset of user-defined digits, comprising the next fourteen digits in the dual dial memory register 2, may be interpreted as at least a portion of the digits of a commonly called telephone address or configuration digits depending on the special sequence digits 4.

In this embodiment, the special sequence digits 4 must all be '9' for the respective control units 110 and 150 to interpret the digits, labeled CF0–CF13, as configuration digits 6 which alter the configuration of the telephone. A special sequence of '9,9,9,9,9' is chosen because it is unlikely for this sequence to be used while dialing a telephone address. If the special sequence digits 4 are not all '9', then the control units 110 and 150 interpret at least a portion of the dual dial memory register 2 digits as those of a commonly called telephone number and the telephone configuration remains unchanged.

Once the respective control units 110 and 150 enter the configuration parameter programming mode and all the special sequence digits 4 are verified to be '9', each of the configuration bits 8 are processed. In this embodiment, the configuration digits 6 are between zero and seven and, therefore, only three configuration bits 8 are required to represent each of them.

The control units 110 and 150 associate each configuration digit 6 with at least one configuration parameter and each configuration bit, or pair of configuration bits, with a particular value that the configuration parameter takes.

Table 2 through Table 19 define the configuration parameter values assigned to the configuration bits 8 of the preferred embodiment of the present invention. The information of Table 2 through Table 19 is part of the software program which is used in the interpretation of the configuration digits 6.

TABLE 2

Dial Mode Truth Table

| CF0 Bit0 | Dial Mode |
|---|---|
| 0 | DTMF |
| 1 | Pulse |

TABLE 3

Dial Pulse Rate Truth Table

| (CF0 bit1, CF0 bit2) | Dial Pulse Rate |
|---|---|
| (0,0) | 10 pps |
| (0,1) | 8 pps |
| (1,0) | 12 pps |
| (1,1) | 20 pps |

TABLE 4

Dial Pulse Make/Break Ratio Truth Table

| (CF1 bit0, CF1 bit1) | Dial Pulse Make/Break Ratio |
|---|---|
| (0,0) | 40/60 |
| (0,1) | 30/70 |
| (1,0) | 66/34 |
| (1,1) | 70/30 |

TABLE 5

Pulse Inter-Digit Delay Truth Table

| (CF1 bit2, CF2 bit0) | Pulse Inter-Digit Delay |
|---|---|
| (0,0) | 500 ms |
| (0,1) | 700 ms |
| (1,0) | 900 ms |
| (1,1) | 1200 ms |

TABLE 6

DTMF Duration Truth Table

| (CF2 bit1, CF2 bit2) | DTMF Duration |
|---|---|
| (0,0) | 70 ms |
| (0,1) | 50 ms |
| (1,0) | 125 ms |
| (1,1) | 200 ms |

TABLE 7

DTMF Inter-Digit Delay Truth Table

| (CF3 bit0, CF3 bit1) | DTMF Inter-Digit Delay |
|---|---|
| (0,0) | 75 ms |
| (0,1) | 50 ms |
| (1,0) | 125 ms |
| (1,1) | 200 ms |

TABLE 8

Pause Duration Truth Table

| (CF3 bit2, CF4 bit0) | Pause Duration |
|---|---|
| (0,0) | 600 ms |
| (0,1) | 400 ms |
| (1,0) | 1200 ms |
| (1,1) | 2500 ms |

TABLE 9

Flash Duration Truth Table

| (CF4 bit1, CF4 bit2) | Flash Duration |
|---|---|
| (0,0) | 600 ms |
| (0,1) | 400 ms |
| (1,0) | 1200 ms |
| (1,1) | 2500 ms |

TABLE 10

Ringer Mode Truth Table

| CF5 bit0 | Ringer Mode |
|---|---|
| 0 | Inhibited |
| 1 | Permitted |

TABLE 11

Ringer Tone Frequency Truth Table

| (CF5 bit1, CF5 bit2) | Ringer Tone |
|---|---|
| (0,0) | Standard Freq. |
| (0,1) | Frequency 1 |
| (1,0) | Frequency 2 |
| (1,1) | Frequency 3 |

TABLE 12

Ringer Volume Truth Table

| (CF6 bit0, CF6 bit1) | Ringer Volume |
|---|---|
| (0,0) | Low |
| (0,1) | Medium Low |
| (1,0) | Medium High |
| (1,1) | High |

TABLE 13

Ring Pattern Ignore Truth Table

| (CF6 bit2, CF7 bit0) | Ring Pattern Ignore |
|---|---|
| (0,0) | Pattern 0 |
| (0,1) | Pattern 1 |
| (1,0) | Pattern 2 |
| (1,1) | Inhibited |

TABLE 14

Key Beep Tone Truth Table

| (CF7 bit1, CF7 bit2) | Key Beep Tone |
|---|---|
| (0,0) | Tone 0 |
| (0,1) | Tone 1 |
| (1,0) | Tone 2 |
| (1,1) | Tone 3 |

TABLE 15

Key Beep Volume Truth Table

| CF8 bit0 | Key Beep Volume |
|---|---|
| 0 | High |
| 1 | Low |

TABLE 16

Key Beep Duration Truth Table

| CF8 bit1 | Key Beep Duration |
|---|---|
| 0 | Standard |
| 1 | Long |

TABLE 17

Receiver Volume Truth Table

| (CF8 bit2, CF9 bit0) | Receiver Volume |
|---|---|
| (0,0) | Low |
| (0,1) | Medium Low |
| (1,0) | Medium High |
| (1,1) | High |

TABLE 18

Key Pad Illumination Duration Truth Table

| (CF9 bit1, CF9 bit2) | Key Pad Illumination Duration |
|---|---|
| (0,0) | 5 Sec |
| (0,1) | 0 Sec |
| (1,0) | 10 Sec |
| (1,1) | 20 Sec |

TABLE 19

Automatic Channel Select Truth Table

| | | Status |
|---|---|---|
| Automatic Channel Select Mode | 0 | Enabled |
| | 1 | Disabled |
| CF10 bit0 | | |
| Automatic Channel Select, Ch1 | 0 | Permitted |
| | 1 | Inhibited |
| CF10 bit1 | | |
| Automatic Channel Select, Ch2 | 0 | Permitted |
| | 1 | Inhibited |
| CF10 bit2 | | |
| Automatic Channel Select, Ch3 | 0 | Permitted |
| | 1 | Inhibited |
| CF11 bit0 | | |
| Automatic Channel Select, Ch4 | 0 | Permitted |
| | 1 | Inhibited |

TABLE 19-continued

Automatic Channel Select Truth Table

| | | Status |
|---|---|---|
| CF11 bit1 | | |
| Automatic Channel Select, Ch5 | 0 | Permitted |
| | 1 | Inhibited |
| CF11 bit2 | | |
| Automatic Channel Select, Ch6 | 0 | Permitted |
| | 1 | Inhibited |
| CF12 bit0 | | |
| Automatic Channel Select, Ch7 | 0 | Permitted |
| | 1 | Inhibited |
| CF12 bit1 | | |
| Automatic Channel Select, Ch8 | 0 | Permitted |
| | 1 | Inhibited |
| CF12 bit2 | | |
| Automatic Channel Select, Ch9 | 0 | Permitted |
| | 1 | Inhibited |
| CF13 bit0 | | |
| Automatic Channel Select, Ch10 | 0 | Permitted |
| | 1 | Inhibited |
| CF13 bit1 | | |
| Reserved | 0 | |
| CF13 bit2 | 1 | |

If the user-defined digits stored in the dual dial memory register are 9,9,9,9,9,0,0,5,2,5,1,5,5,7,2,0,0,0,0 then the control units 110 and 150 interpret the digits, in accordance with the information of Table 2 through Table 19 of the software program, and program the configuration parameters of the telephone as defined by Table 1. When the control units 110 and 150 enter the configuration parameter programming mode and receive the above mentioned, user-defined digits of the dual dial memory register 2, the control units 110 and 150 recognize the first five special sequence digits 4 as all being '9'. The control units 110 and 150 interpret the three bits of the configuration digits 6 as shown in Table 20.

TABLE 20

Significant Bits of the Configuration Digits of this embodiment.

| Configuration Digit | Decimal Value | Configuration Bits | | |
|---|---|---|---|---|
| | | Bit2 | Bit1 | Bit0 |
| CF0 | 0 | 0 | 0 | 0 |
| CF1 | 0 | 0 | 0 | 0 |
| CF2 | 5 | 1 | 0 | 1 |
| CF3 | 2 | 0 | 1 | 0 |
| CF4 | 5 | 1 | 0 | 1 |
| CF5 | 1 | 0 | 0 | 1 |
| CF6 | 5 | 1 | 0 | 1 |
| CF7 | 5 | 1 | 0 | 1 |
| CF8 | 7 | 1 | 1 | 1 |
| CF9 | 2 | 0 | 1 | 0 |
| CF10 | 0 | 0 | 0 | 0 |
| CF11 | 0 | 0 | 0 | 0 |
| CF12 | 0 | 0 | 0 | 0 |
| CF13 | 0 | 0 | 0 | 0 |

Figure 3A:
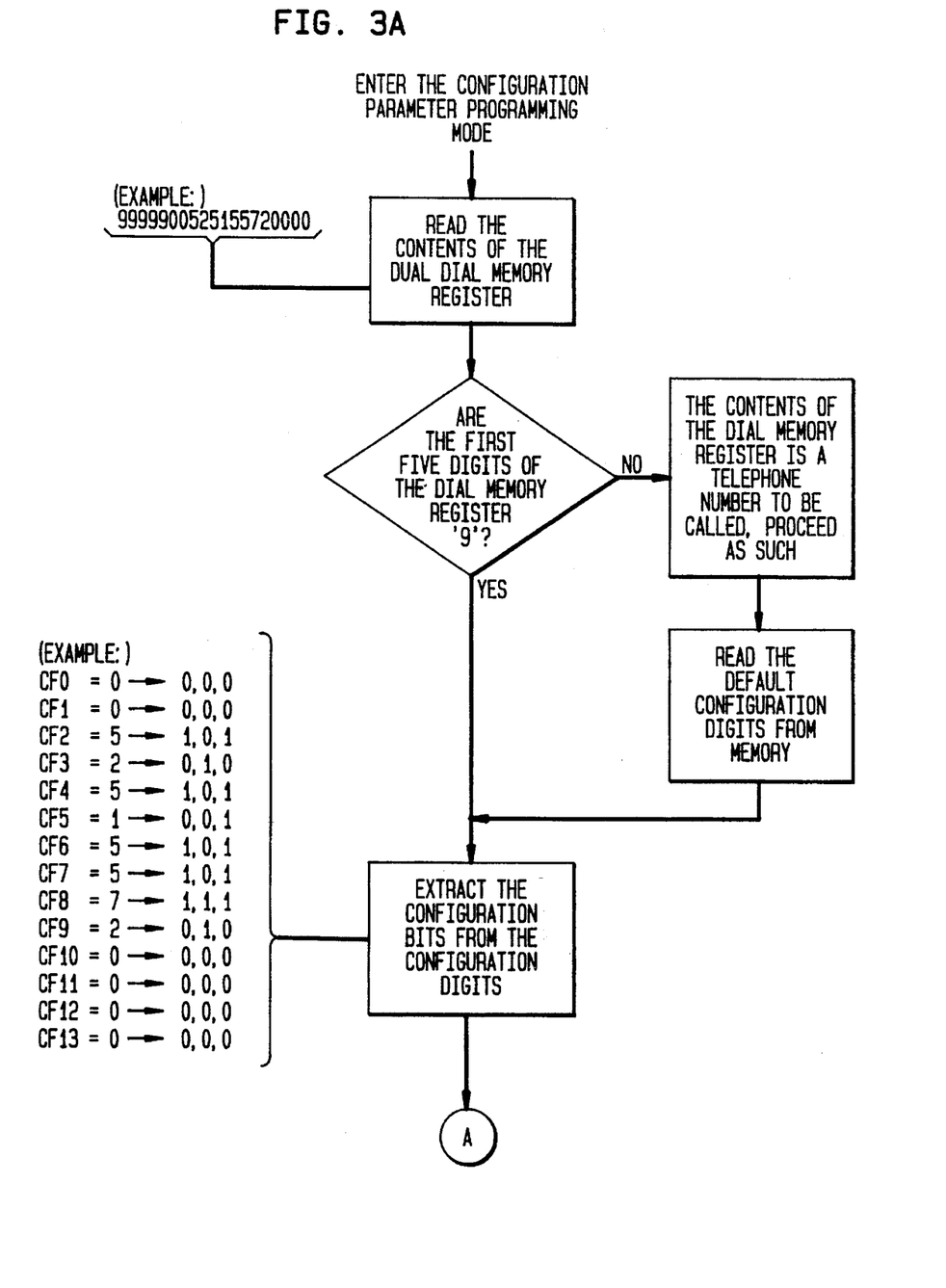
FIG. 3a through 3f is a software flow diagram which defines a portion of the actions taken by the control unit of the preferred embodiment of the present invention.

A portion of the software programming code of the handset control unit 110 and the base control unit 150 is defined by FIG. 3a through 3f. The configuration parameter programming mode is entered periodically in accordance with a main software program of the control units 110 and 150. In this embodiment of the present invention, the configuration parameter programming mode is entered at least 20 times each minute. With reference to FIG. 3a, the control unit 110 reads the contents of the dual dial memory register 2 (an example of user defined digits are shown). If the first five digits of the dual dial memory register 2 are '9', the control units 110 and 150 extract the configuration bits 8 from the configuration digits 6. When the first five digits of the dual dial memory register are not all '9', the control units 110 and 150 read a set of default configuration digits from a permanent memory means (not shown) and extract the configuration bits, CF0 bit0 through CF13 bit2, from the configuration digits.

Figure 3B:
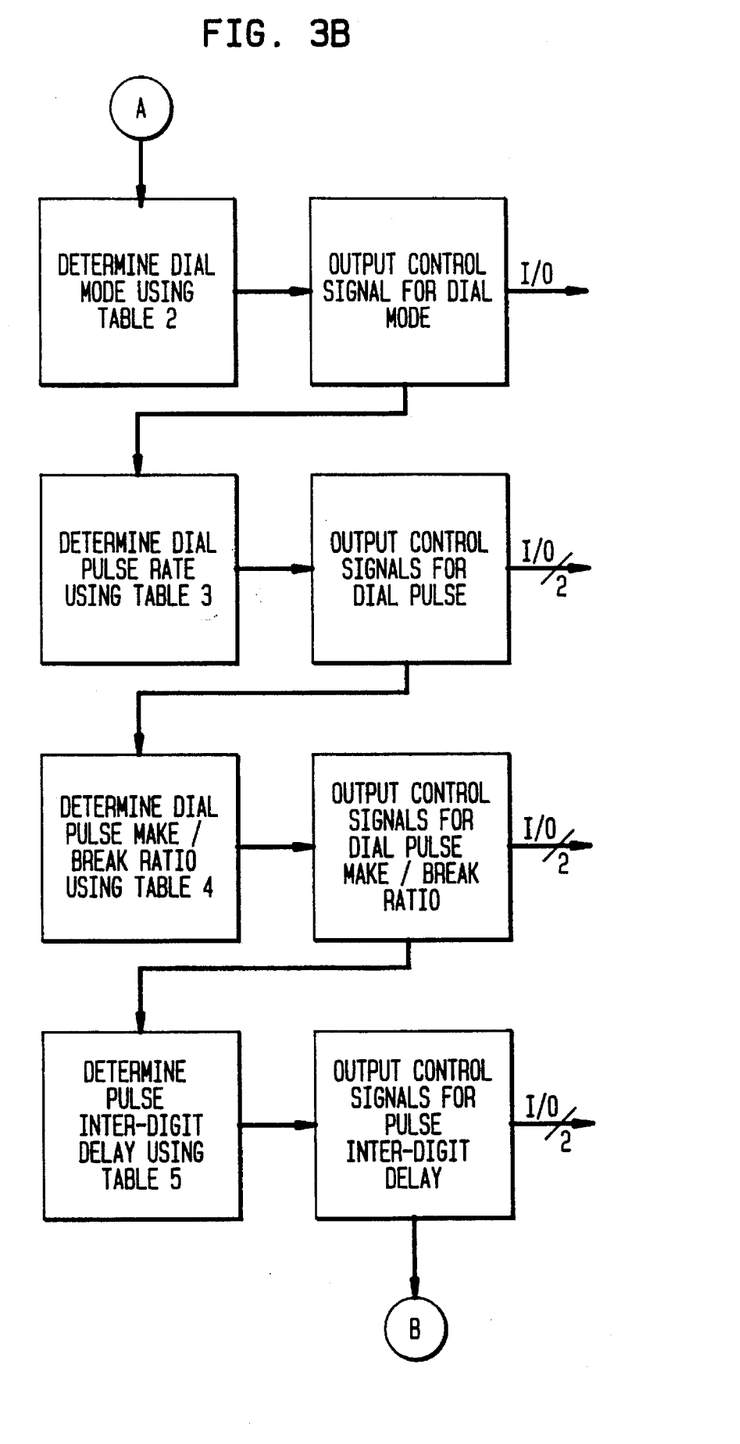

With reference to FIG. 3b, CF0 bit 0 is compared with the configuration parameter template defined by Table 2 to determine the Dial Mode and the appropriate I/O signal is generated to configure a first part of the generator circuit 156. CF0 bit 1 and CF0 bit 2 are compared with the configuration parameter template defined by Table 3 to determine the Dial Pulse Rate and the appropriate I/O signals are generated to configure a second part of the generator circuit 156. CF1 bit 0 and CF1 bit 1 are compared with the configuration parameter template defined by Table 4 to determine the Dial Pulse Make/Break Ratio and the appropriate I/O signals are generated to configure a third part of the generator circuit 156. Likewise, CF1 bit 2 and CF2 bit 0 are compared with the configuration parameter template defined by Table 5 to determine the Pulse Inter-Digit Delay and the appropriate I/O signals are generated to configure a fourth part of the generator circuit 156.

Figure 3C:
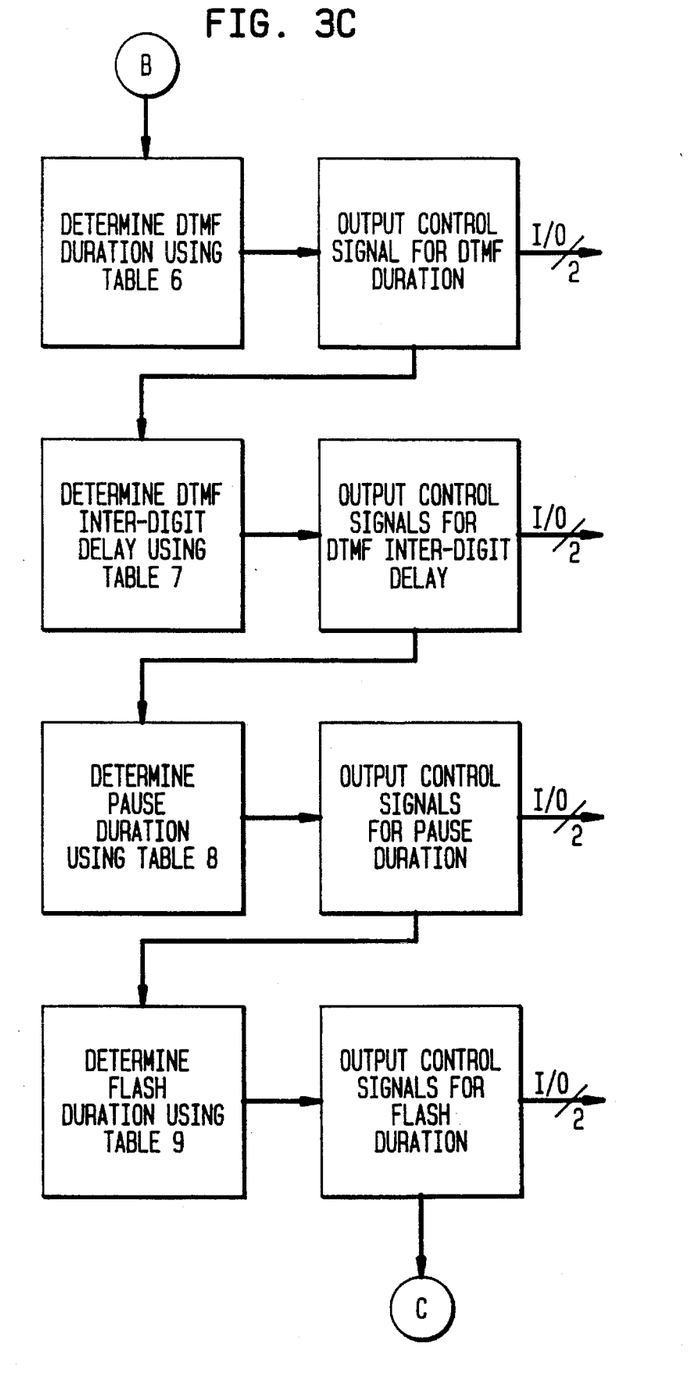

With reference to FIG. 3c, CF2 bit 1 and CF2 bit 2 are compared with the configuration parameter template defined by Table 6 to determine the DTMF Duration and the appropriate I/O signals are generated to configure a fifth part of the generator circuit 156. Likewise, CF3 bit 0 and CF3 bit 1 are compared with the configuration parameter template defined by Table 7 to determine the DTMF Inter-Digit Delay and the appropriate I/O signals are generated to configure a sixth part of the generator circuit 156. CF3 bit 2 and CF4 bit 0 are compared with the configuration parameter template defined by Table 8 to determine the Pause Duration and the appropriate signals are generated within the control units 110 and 150 to facilitate a pause between two consecutive dial digits. CF4 bit 1 and CF4 bit 2 are compared with the configuration parameter template defined by Table 9 to determine the Flash Duration and the appropriate I/O signals are generated to configure the telephone circuit 151.

Figure 3D:
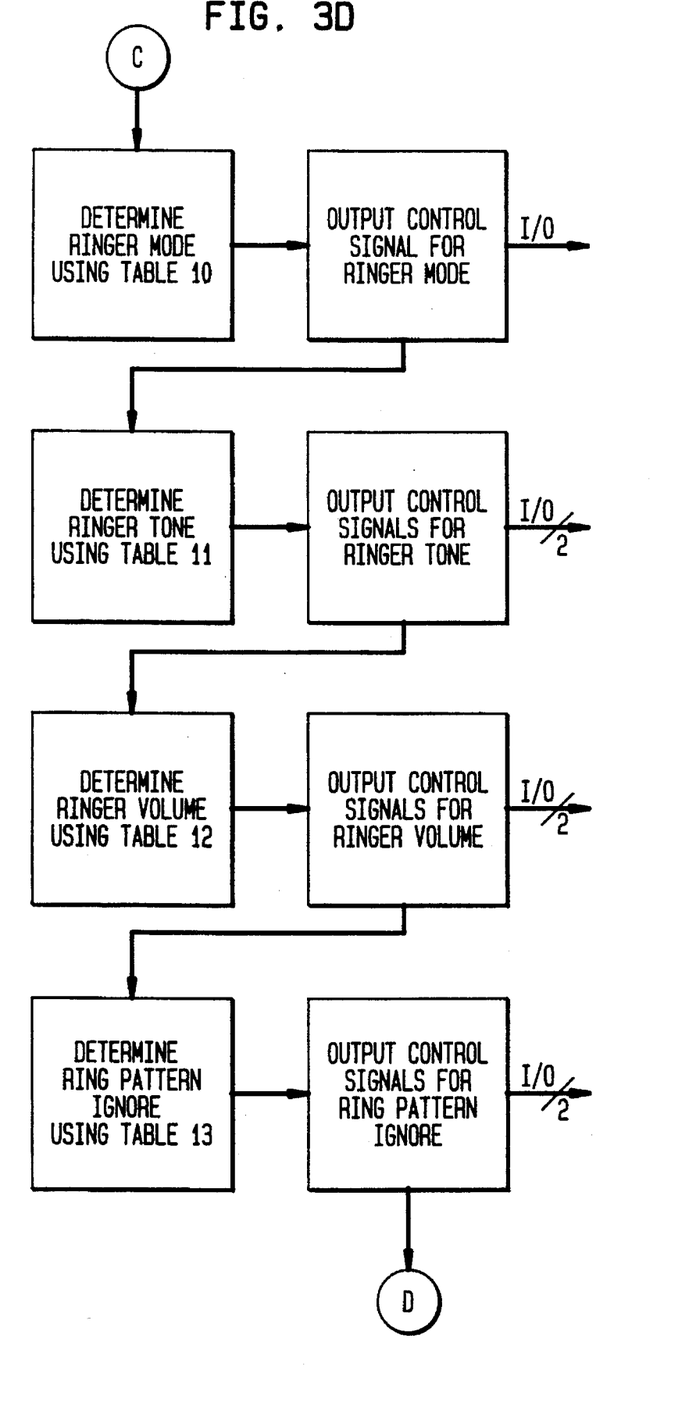

With reference to FIG. 3d, CF5 bit 0 is compared with the configuration parameter template defined by Table 10 to determine the Ringer Mode and the appropriate I/O signal is generated to configure a first part of the ringer circuit 140. CF5 bit 1 and CF5 bit 2 are compared with the configuration parameter template defined by Table 11 to determine the Ringer Tone and the appropriate I/O signals are generated to configure a second part of the ringer circuit 140. Likewise, CF6 bit 0 and CF6 bit 1 are compared with the configuration parameter template defined by Table 12 to determine the Ringer Volume and the appropriate I/O signals are generated to configure a third part of the ringer circuit 140. CF6 bit 2 and CF7 bit 0 are compared with the configuration parameter template defined by Table 13 to determine the ring pattern to be ignored and the appropriate signals are generated within the control units 110 and 150 to ensure the desired telephone operation.

Figure 3E:
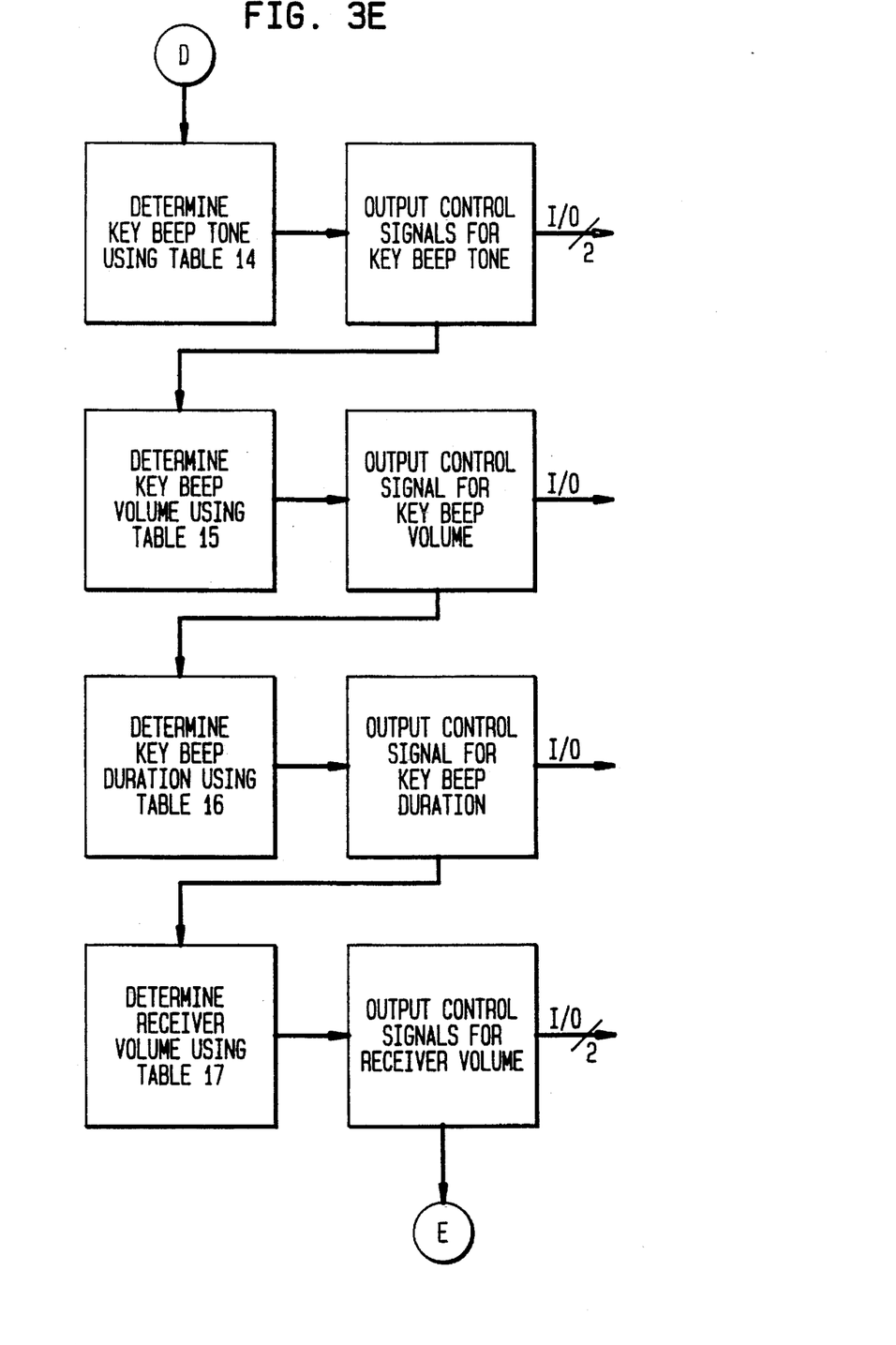

With reference to FIG. 3e, CF7 bit 1 and CF7 bit 2 are compared with the configuration parameter template defined by Table 14 to determine the Key Beep Tone and the appropriate I/O signals are generated to configure the control unit 110. CF8 bit 0 is compared with the configuration parameter template defined by Table 15 to determine the Key Beep Volume and the appropriate I/O signal is generated to configure the control unit 110 for proper volume levels. CF8 bit 1 is compared with the configuration parameter template defined by Table 16 to determine the Key Beep Duration and the appropriate I/O signal is generated to configure the control unit 110 for proper audible tone durations. CF8 bit 2 and CF9 bit 0 are compared with the configuration parameter template defined by Table 17 to determine the Receiver Volume and the appropriate I/O signals are generated to configure the receiver 114.

Figure 3F:
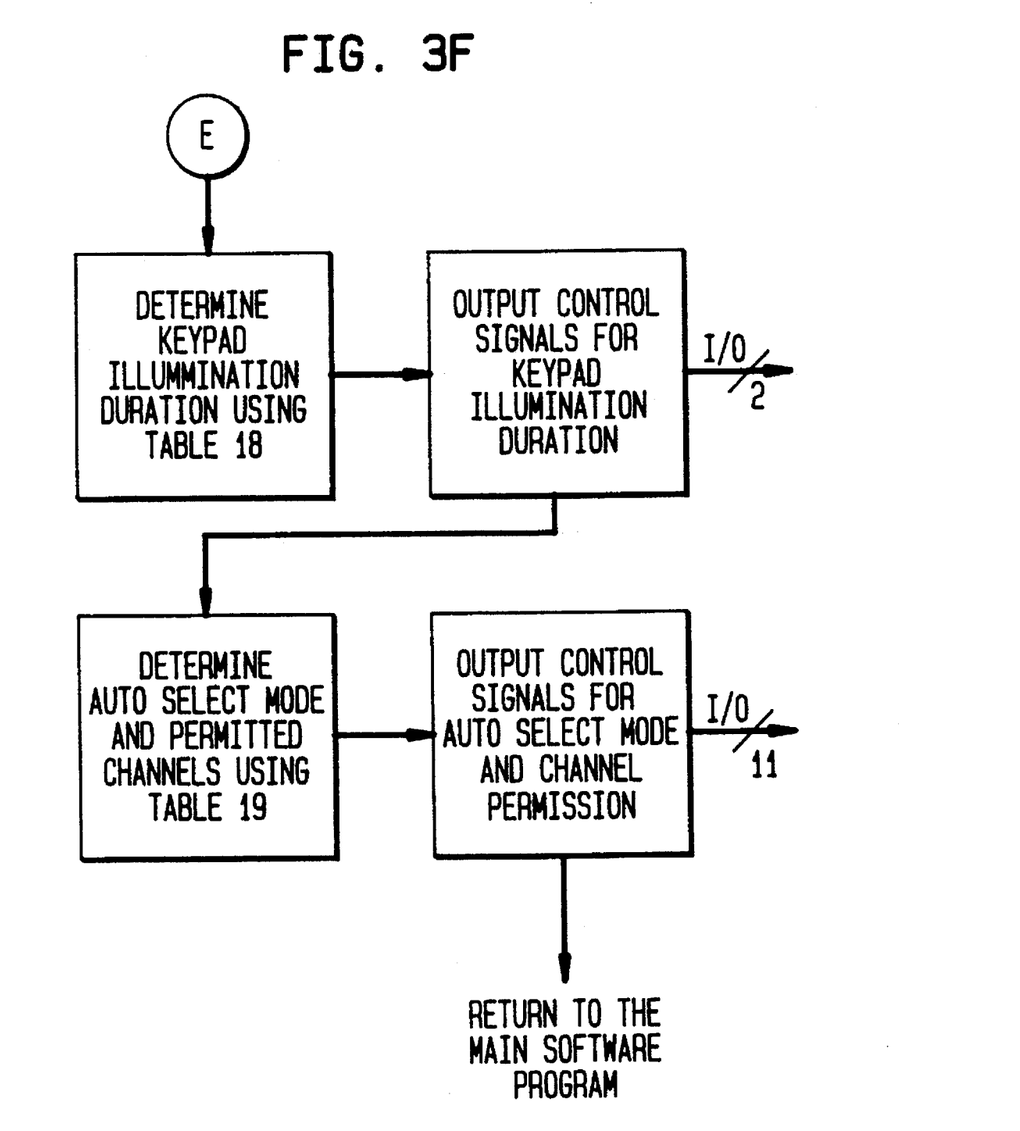

With reference to FIG. 3f, CF9 bit 1 and CF9 bit 2 are compared with the configuration parameter template defined by Table 18 to determine the Keypad Illumination Duration and the appropriate I/O signals are generated to configure the illumination driver 130. CF10 bit 0 through CF13 bit 1 are compared with the configuration parameter template defined by Table 19 to determine the Automatic Channel Select Mode and permitted Automatic Channel Select channels and the appropriate I/O signals are generated to configure the respective receivers 114 and 153, and respective transmitters 113 and 152. The telephone returns to the main software program to execute further instructions and enters the configuration parameter programming mode again several seconds later.

The following patent is hereby incorporated into this patent specification by reference:

U.S. Pat. No. 5,044,010.

I claim:

1. A configuration parameter programming system comprising: means for storing configuration parameter data; means for inputting said configuration parameter data into the means for storing the configuration parameter data; and means for interpreting the configuration parameter, wherein said means for storing said configuration parameter data is a single memory location dual dial memory register the memory register used for the dual purpose of providing a user an accessible storage medium for storing telephone configuration parameter data and dialing digits of a commonly called telephone number, said dual dial memory register comprising a first and second subset of user defined digits, the first subset comprising special sequence digits used to indicate how the second subset is to be used, the second subset comprising user defined digits interpreted as a commonly called telephone number or configuration digits depending on the special sequence, wherein said means for storing said configuration parameter data comprises at least one of location specific configuration parameter data; user specific configuration parameter data; and cordless telephone specific configuration parameter data, and wherein said at least one of location specific configuration parameter data; user specific configuration parameter data; cordless telephone specific configuration parameter data are user and manufacturer accessible and programmable without requiring equipment other than the equipment other than the equipment of said configuration parameter programing system, and wherein said means for inputting said configuration parameter data into said means for storing the configuration parameter data is a keypad.

2. The configuration parameter programming system of claim 1 wherein said location specific configuration parameter data comprises:

i) Dial Mode;

ii) Dial Pulse Rate;

iii) Dial Pulse Make/Break Ratio;

iv) Pulse Inter-Digit Delay;
v) DTMF Duration;
vi) DTMF Inter-Digit Delay;
vii) Pause Duration; and
viii) Flash Duration.

3. The configuration parameter programming system of claim 1 wherein said user specific configuration parameter data comprises:
 i) Ringer mode;
 ii) Ringer Tone;
 iii) Ringer Volume;
 iv) Ring Pattern Ignore;
 v) Key Beep Tone;
 vi) Key Beep Volume;
 vii) Key Beep Duration;
 viii) Receiver Volume; and
 ix) Key Pad Illumination Duration.

4. The configuration parameter programming system of 1 wherein said cordless specific configuration parameter data comprises:
 i) Automatic Channel Select Mode Enable/Disable;
 ii) Automatic Channel Select Channels Permit/Inhibit.

5. The configuration parameter programming system of claim 1 wherein said means for interpreting the configuration parameter data comprises a software programmed microprocessor.

6. A telephone comprising a telephone configuration parameter programming system further comprising: means for storing configuration parameter data; means for inputting said configuration parameter data into the means for storing the configuration parameter data; and means for interpreting the configuration parameter, wherein said means for storing said configuration parameter data is a single memory location dual dial memory register the memory register used for the dual purpose of providing a user an accessible storage medium for storing telephone configuration parameter data and dialing digits of a commonly called telephone number, said dual dial memory register comprising a first and second subset of user defined digits, the first subset comprising special sequence digits used to indicate how the second subset is to be used, the second subset comprising user defined digits interpreted as a commonly called telephone number or configuration digits depending on the special sequence, wherein said means for storing said configuration parameter data comprises at least one of location specific configuration parameter data; user specific configuration parameter data; and cordless telephone specific configuration parameter data, and wherein said at least one of location specific configuration parameter data; user specific configuration parameter data; cordless telephone specific configuration parameter data are user and manufacturer accessible and programmable without requiring equipment other than the equipment other than the equipment of said configuration parameter programming system, and wherein said means for inputting said configuration parameter data into said means for storing the configuration parameter data is a keypad.

7. The telephone of claim 6 wherein said location specific configuration parameter data comprises:
 i) Dial Mode;
 ii) Dial Pulse Rate;
 iii) Dial Pulse Make/Break Ratio;
 iv) Pulse Inter-Digit Delay;
 v) DTMF Duration;
 vi) DTMF Inter-Digit Delay;
 vii) Pause Duration; and
 viii) Flash Duration.

8. The telephone claim 6 wherein said user specific configuration parameter data comprises:
 i) Ringer mode;
 ii) Ringer Tone;
 iii) Ringer Volume;
 iv) Ring Pattern Ignore;
 v) Key Beep Tone;
 vi) Key Beep Volume;
 vii) Key Beep Duration;
 viii) Receiver Volume; and
 ix) Key Pad Illumination Duration.

9. The telephone of claim 6 wherein said configuration parameter data further comprises cordless telephone specific configuration parameter data further comprising:
 i) Automatic Channel Select Mode Enable/Disable; and
 ii) Automatic Channel Select channels Permit/Inhibit.

10. The telephone of claim 6 wherein said means for interpreting the configuration parameter data comprises a software programmed microprocessor.

11. The telephone of claim 3 comprising a cordless telephone further comprising:

control means for establishing communications between a handset unit and a base unit, said control means changing a base unit and a handset unit from a standby state to an active state whenever user initiated communications exists between these units, the communications being established in the active state over one of a plurality of channels, said control means further providing interpretation of said configuration parameter data and producing a corresponding plurality of control signals for altering the configuration of the telephone circuitry, said base unit further comprising:
 a first transmitter and a first receiver, said first transmitter and first receiver having a configuration that is alterable according to said configuration data, said alteration being achieved via a plurality of control signals from said control unit;
 means for providing a communications interface between the telephone and a central office, said means for providing a communications interface being alterable according to said configuration parameter data, said alteration being achieved via a plurality of control signals from said control unit;
 means for generating a telephone dial signal, said telephone dial signal generating means configuration being alterable according to said configuration parameter data, said alteration being achieved via a plurality of control signals from said control unit;
 channel scanning means for scanning a plurality of communication channels, said scanning means being operable for detecting the presence of interference on each one of the plurality of communication channels while the handset unit and the base unit are in a standby state wherein no user initiated communications exists between these units, said channel scanning means configuration being alterable according to said configuration data, said alteration being achieved via a plurality of control signals from said control means; and means for assigning an ordered position to each of the plurality of channels in accordance with the interference detected on each channel while the base unit is in the standby state, the ordered position of each channel being indicative of the period during which the interference last occurred on each one of the plurality of channels, said assigning means configuration being alterable according to said configuration parameter data, said alteration being achieved via a plurality of control signals from said control means;

said handset unit further comprising:

a second transmitter and a second receiver for respectively transmitting to said first receiver and receiving from said first transmitter in the base unit over any one of a plurality of communication channels, said second transmitter and second receiver configuration that is alterable according to said configuration parameter data, said alteration being achieved via a plurality of control signals from said control unit;

means for illuminating a telephone keypad, said telephone keypad illumination means configuration being alterable according to said configuration parameter data, said alteration being achieved via a plurality of control signals from said control unit; and means for producing an audible signal indicating an incoming telephone call, said audible signal producing means configuration being alterable according to said configuration parameter data, said alteration being achieved via a plurality of input signals from the control unit.

12. The cordless telephone of claim 11 wherein said configuration parameter data further comprises: cordless telephone specific configuration parameter data.

13. The cordless telephone of claim 12 wherein said cordless telephone specific configuration parameter data further comprises:

i) Automatic Channel Select Mode Enable/Disable; and ii) Automatic Channel Select channels Permit/Inhibit.

14. The telephone of claim 6 comprising a corded telephone, further comprising:

means for providing a communications interface between the telephone and the central office, the central office interface means configuration being alterable according to said configuration parameter data, said alteration being achieved via a plurality of control signals from said control unit;

means for generating a telephone dial signal, said telephone dial signal generating means configuration being alterable according to said configuration parameter data, said alteration being achieved via a plurality of control signals from the control unit;

means for illuminating a telephone keypad, said telephone keypad illumination means configuration being alterable according to said configuration parameter data, said alteration being achieved via a plurality of control signals from said control unit; and means for producing an audible signal indicating an incoming telephone call, said audible signal producing means configuration being alterable according to said configuration parameter data, said alteration being achieved via a plurality of input signals from the control unit.

15. The corded telephone of claim 14 wherein said location specific configuration parameter data comprises:

i) Dial Mode;

ii) Dial Pulse Rate;

iii) Dial Pulse Make/Break Ratio;

iv) Pulse Inter-Digit Delay;

v) DTMF Duration;

vi) DTMF Inter-Digit Delay;

vii) Pause Duration; and viii) Flash Duration.

16. The corded telephone claim 14 wherein said user specific configuration parameter data comprises:

i) Ringer mode;

ii) Ringer Tone;

iii) Ringer Volume;

iv) Ring Pattern Ignore;

v) Key Beep Tone;

vi) Key Beep Volume;

vii) Key Beep Duration;

viii) Receiver Volume; and ix) Key Pad Illumination Duration.

* * * * *